United States Patent [19]

Kurogane et al.

[11] Patent Number: 4,998,132

[45] Date of Patent: Mar. 5, 1991

[54] IMAGE EDIT SYSTEM

[75] Inventors: Toshio Kurogane; Daiji Nagaoka, both of Kanagawa, Japan

[73] Assignee: Fuji Xerox Co., Ltd., Tokyo, Japan

[21] Appl. No.: 440,082

[22] Filed: Nov. 22, 1989

[30] Foreign Application Priority Data

Nov. 26, 1988 [JP] Japan .................................. 63-298477

[51] Int. Cl.$^5$ ............................................. G03B 27/52
[52] U.S. Cl. ...................................... 355/40; 355/218
[58] Field of Search ..................... 355/40, 202, 218, 41

[56] References Cited

U.S. PATENT DOCUMENTS

| | | | |
|---|---|---|---|
| 4,742,373 | 5/1988 | Nakatani ........................... | 355/40 X |
| 4,763,165 | 8/1988 | Watanabe ........................... | 355/218 |
| 4,777,510 | 10/1988 | Russsel ................................ | 355/218 |
| 4,843,426 | 6/1989 | Levine ................................ | 355/202 |
| 4,866,474 | 9/1989 | Kinoshita et al. .................... | 355/218 |

*Primary Examiner*—Richard A. Wintercorn
*Assistant Examiner*—D. Rutledge

*Attorney, Agent, or Firm*—Finnegan, Henderson, Farabow, Garrett, and Dunner

[57] ABSTRACT

An image edit system comprises a write circuit for writing specific bits into areas about locations in a bit map memory in accordance with the coordinates of a plurality of points as entered by a coordinates entering unit, the locations in a bit map memory corresponding to the plurality of points, an image input unit for reading an image on an original by scanning the original, a read circuit for reading out the contents of the bit map memory in synchronism with the scanning by the image input unit, and a circuit for replacing the data of the image on the original with specific data or adding the specific data to the image data when the specific bits are read out of the bit map memory.

Specific bits are written into the bit map memory, in a pattern about the points designated by the coordinates entering unit. When the original image is scanned, the contents of the bit map memory are read out in synchronism with the scan. During the course of the reading operation, when the pattern is detected, an image of red, for example, is superposed on an image of the original.

11 Claims, 10 Drawing Sheets

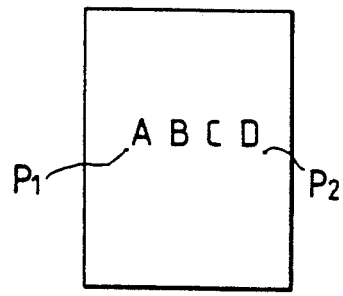
FIG. 8(a)
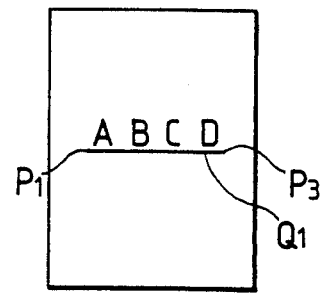
FIG. 8(b)
FIG. 9(a)
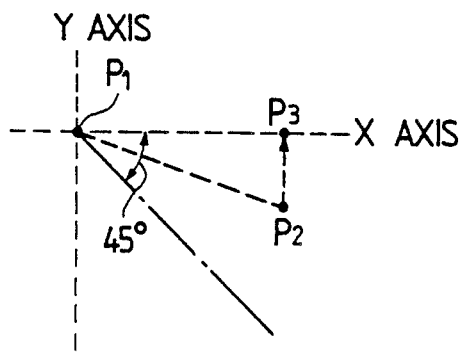
FIG. 9(b)
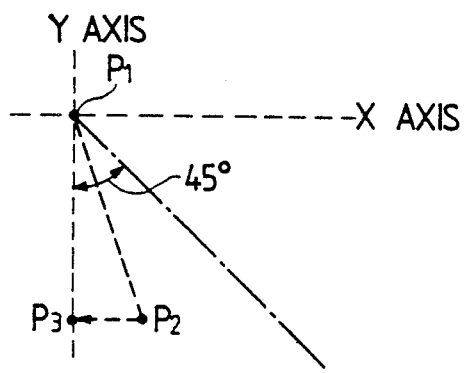
FIG. 10(a)
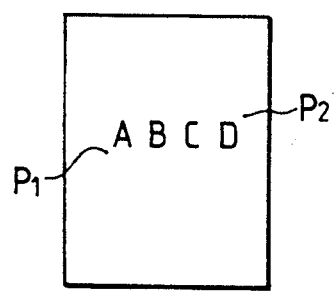
FIG. 10(b)
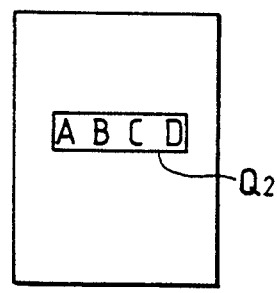

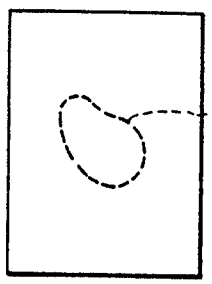
FIG. 11(a)
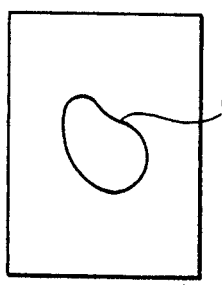
FIG. 11(b)
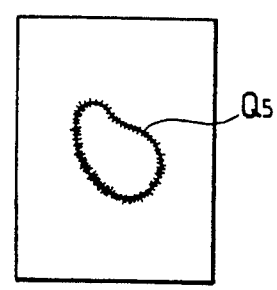
FIG. 11(c)
FIG. 12(a)
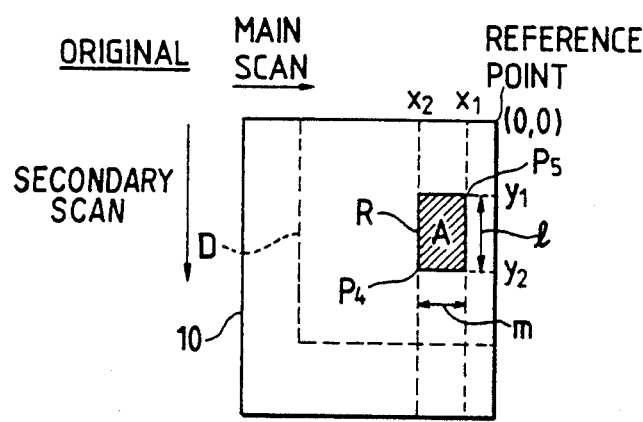
FIG. 12(b)
FIG. 12(c)
FIG. 12(d)
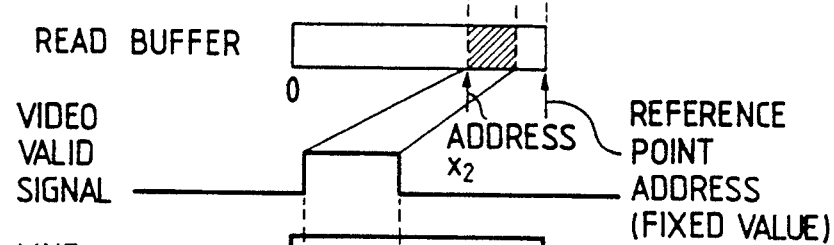
FIG. 12(e)
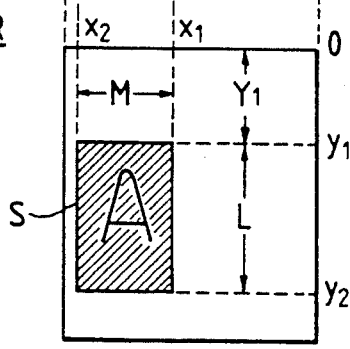

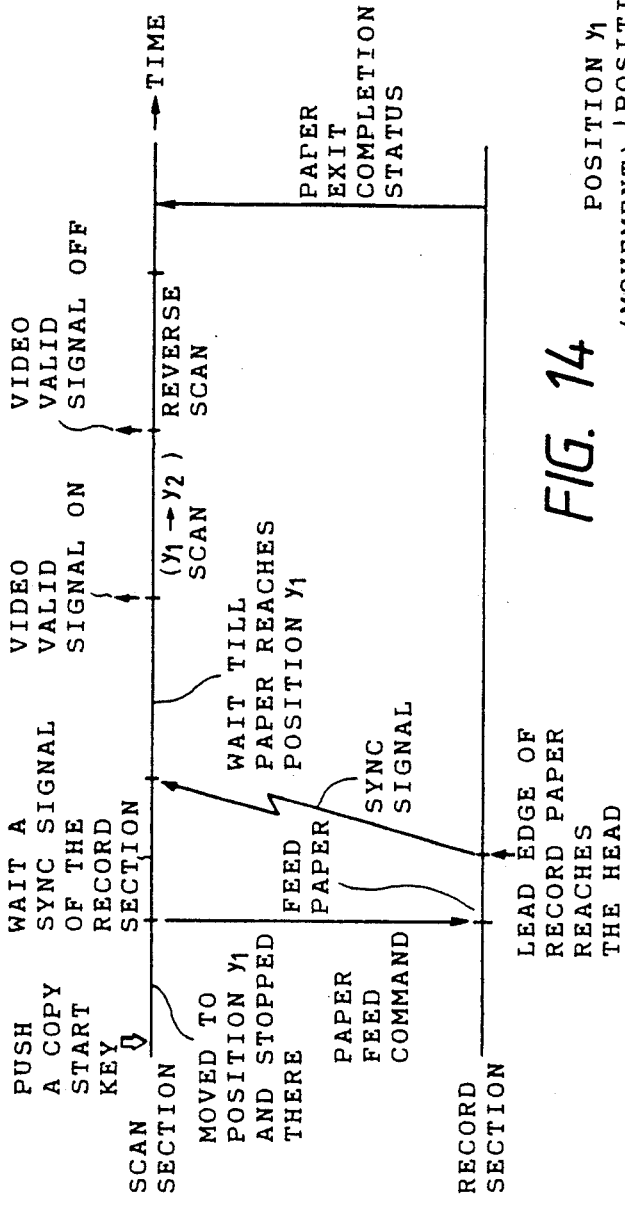
FIG. 13
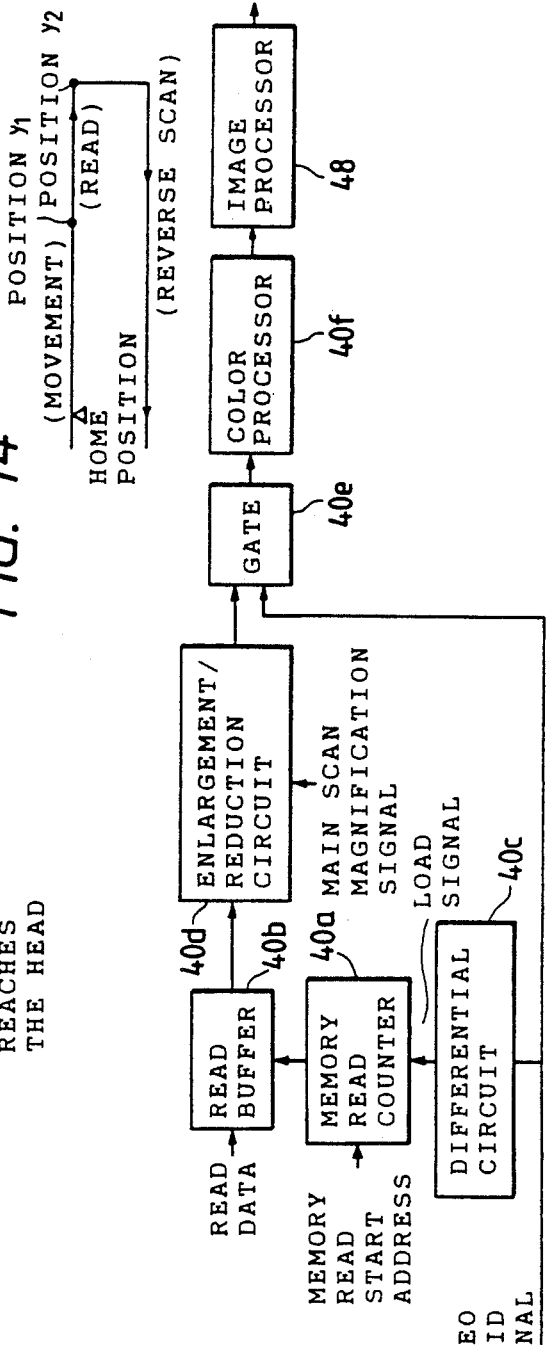
FIG. 14
FIG. 15

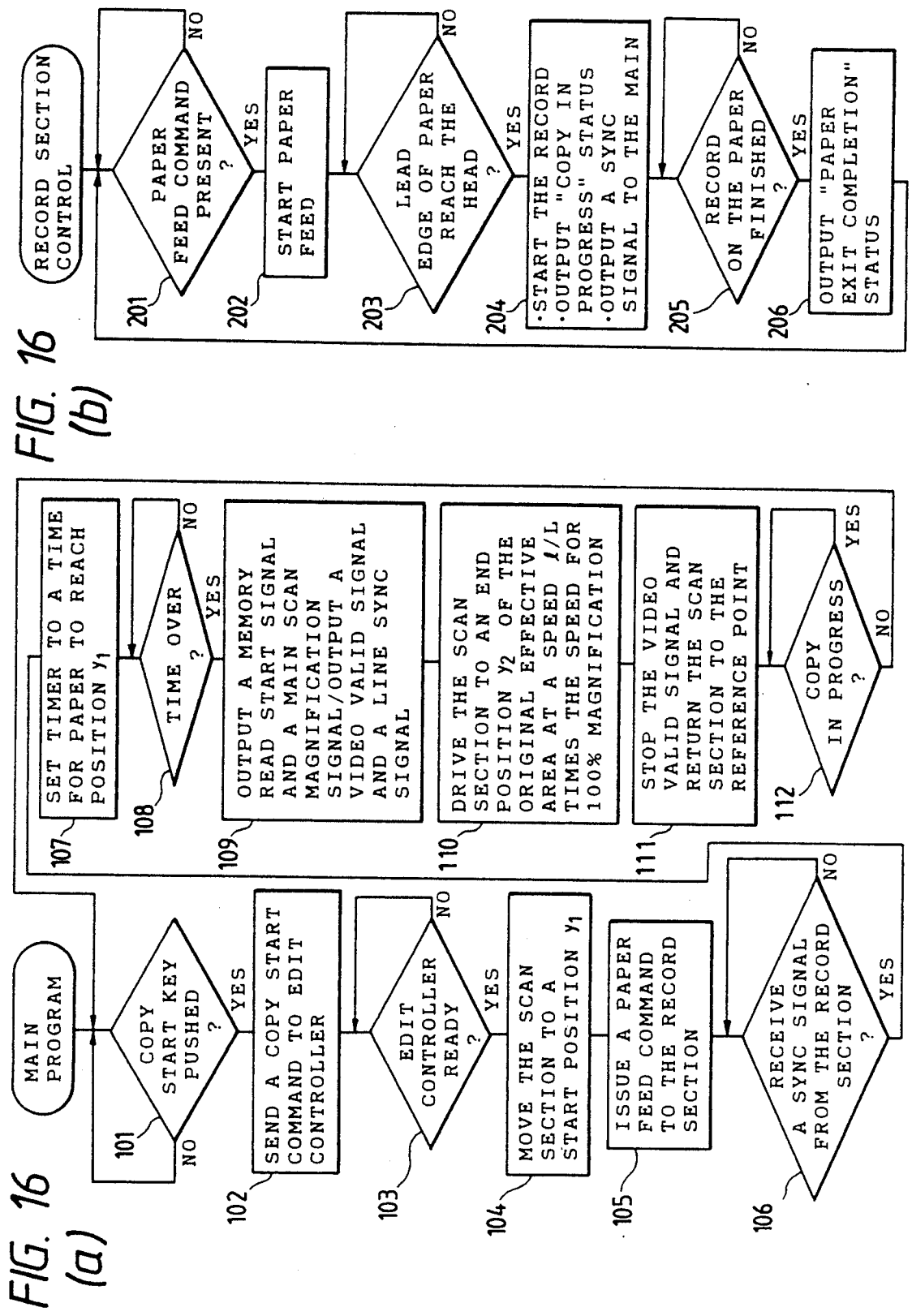

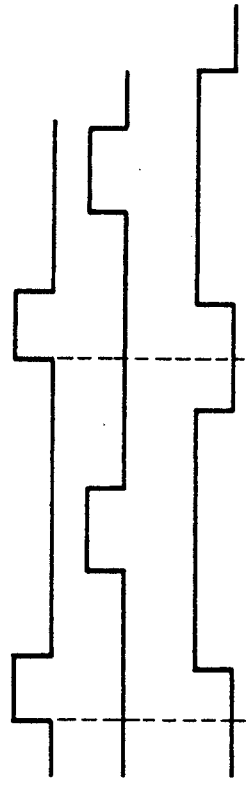
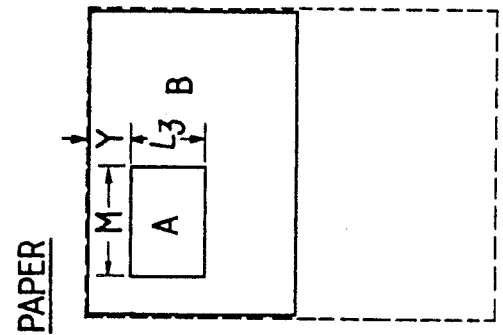
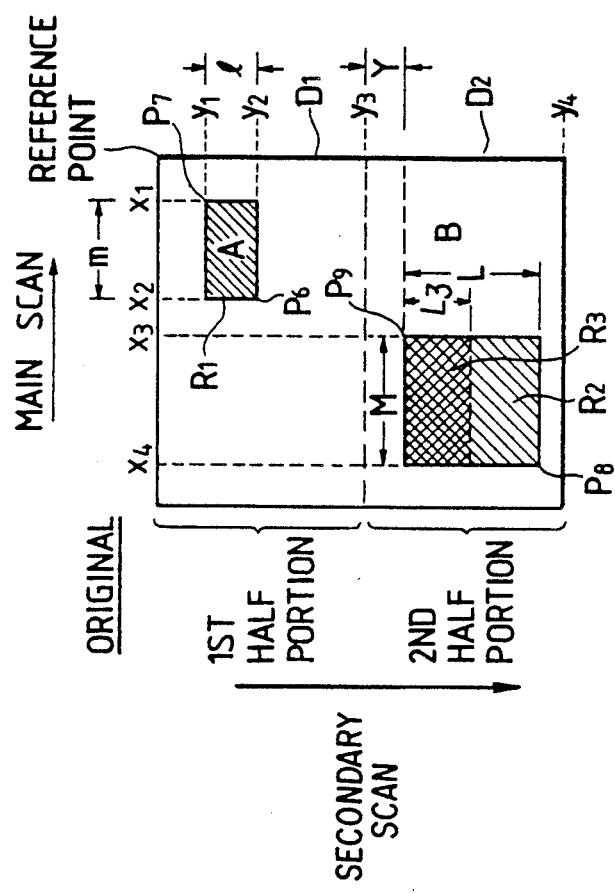
FIG. 17(a) LINE REFERENCE SIGNAL
FIG. 17(b) VIDEO VALID SIGNAL
FIG. 17(c) LINE SYNC SIGNAL
FIG. 18(a)
FIG. 18(b)

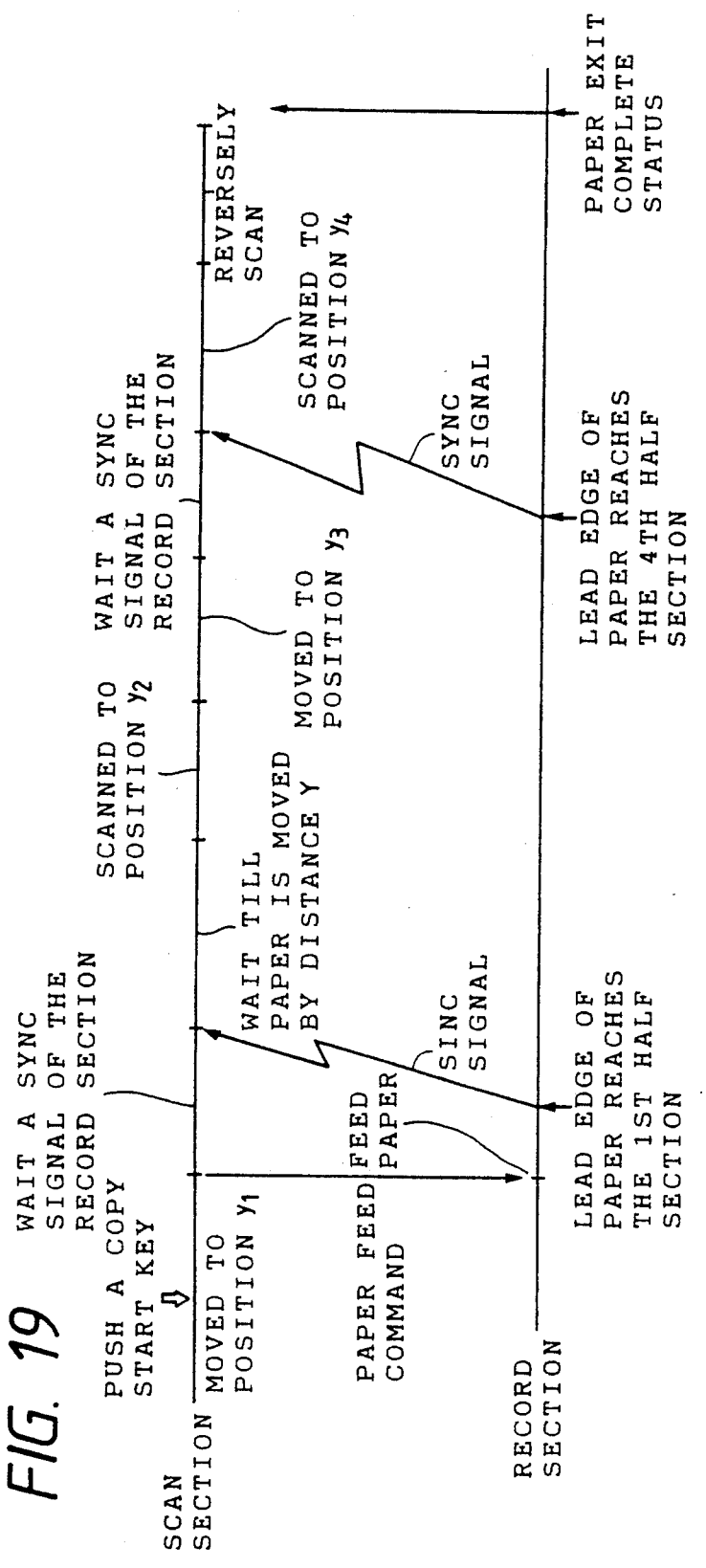

IMAGE EDIT SYSTEM

BACKGROUND OF THE INVENTION

1. Field Invention

The present invention relates to an image edit system for use with a copying machine, and more particularly to an image edit system capable of making a novel image expression.

2. Prior Art Description

A copying machine recently developed and practically used has a function to actively edit an image, for example, to designate a specific area of an image on an original and to pick up or delete a partial image within the designated area, in addition to mere copying of the original image.

In this type of copying machine, when an image is edited, it is necessary to designate an edited area of the image. To designate the edited area, a coordinates input device, called a digitizer, is frequently used. The digitizer has a plane of the size substantially equal to that of an original. In use, an operator puts an original on the digitizer, and designates an area to be edited. The designated area is inputted into the copying machine, in the form of coordinates data. The digitizer is assembled into a platen cover of the copying machine, and accordingly is hinged to the machine and swung against a platen glass.

To make a copy, an operator closes the platen cover, puts an original on the cover, facing upward, and he makes a necessary edition of an image on the original. Then, he removes the original from the platen cover, opens the platen cover, and puts the original in place on the platen glass Afterwards, he closes the platen cover, and pushes a start key. The copying machine copies the original image, and produces an edited copy.

The editions that can be made by the conventional copying machine are limited to relatively simple editions, such as pick-up and delete. The limited number of editions have unsatisfactorily met various user's requirements for edition.

SUMMARY OF THE INVENTION

Accordingly, an object of the present invention is to provide an image edit system with novel and unique image processings.

To achieve the above object, there is provided an image edit system comprising:
- a write means for writing specific bits into areas about locations in a bit map memory in accordance with the coordinates of a plurality of points as entered by a coordinates input means, said locations in the bit map memory corresponding to said plurality of points;
- an image input unit for reading an image on an original by scanning the original;
- a read means for reading out the contents of said bit map memory in synchronism with the scanning by said image input unit; and
- a means for replacing the data of said image on the original with specific data or adding said specific data to said image data, when said specific bits are read out of said bit map memory.

Preferably, the image edit system is provided with an altering means for altering said areas in said bit map memory, which corresponds to said plurality of points and where said specific bits are to be written.

In the present invention, specific bits are written into the bit map memory, in a pattern existing about the points designated by the coordinates input means. When the original image is scanned, the contents of the bit map memory are read out in synchronism with the scan. During the course of the reading operation, when the pattern is detected, an image of red, for example,, is superposed on an image of the original. If an area of the pattern is variable, it is possible to obtain an output image in which dots having a desired size or a line having a desired width is superposed on a proper location in the image.

Other objects, features and advantages of the present invention will be apparent from the following description taken in connection with the accompanying drawings.

BRIEF DESCRIPTION OF THE DRAWINGS

FIGS. 8(a) and 8(b) are explanatory diagrams showing the correspondence between an image on an original and an image on a record paper at the time of the processing for depicting a straight line;

FIGS. 9(a) 9(b) are explanatory diagrams showing the correspondence between the input coordinates and a depicted straight line at the time of the straight line processing;

FIGS. 10(a) and 10(b) are explanatory diagrams showing the correspondence between an image on an original and an image on a record paper in a frame edit mode;

FIGS. 11(a) and 11(b) and 11(c) are explanatory diagrams showing the correspondence between an image on an original and images on a record paper in a trace edit mode;

FIGS. 12(a) through 12(e) are explanatory diagrams comparatively showing an image on an original and an image on a record paper when the machine is in the pick-up/movement mode;

FIG. 13 is an explanatory diagram showing a timing relationship between a scan section and a record section when the machine is in the pick-up/movement mode;

FIG. 14 is an explanatory diagram showing a movement of the scan unit when the machine is in the pick-up/movement mode;

FIG. 15 shows a block diagram of a hardware for the the pick-up/movement mode;

FIG. 16(a) shows a flowchart of a main program for controlling the copying machine;

FIG. 16(b) shows a flowchart of a program for controlling the record unit;

FIGS. 17(a) through 17(c) show a set of waveforms at key signals in the pick-up/movement mode;

FIGS. 18(a) and 18(b) are explanatory diagrams comparatively showing images on an original and an image on a record paper when an analogous composition mode is exercised;

FIG. 19 is an explanatory diagram showing a timing relationship between the scan section and the record section when the analogous composition mode progresses; and FIG. 20 is an explanatory diagram showing a movement of the scan unit in the analogous composition mode.

DETAILED DESCRIPTION OF THE PREFERRED EMBODIMENT

An embodiment of the present invention, which is believed to be preferable, will be described in detail with reference to the accompanying drawings.

Figure 1:
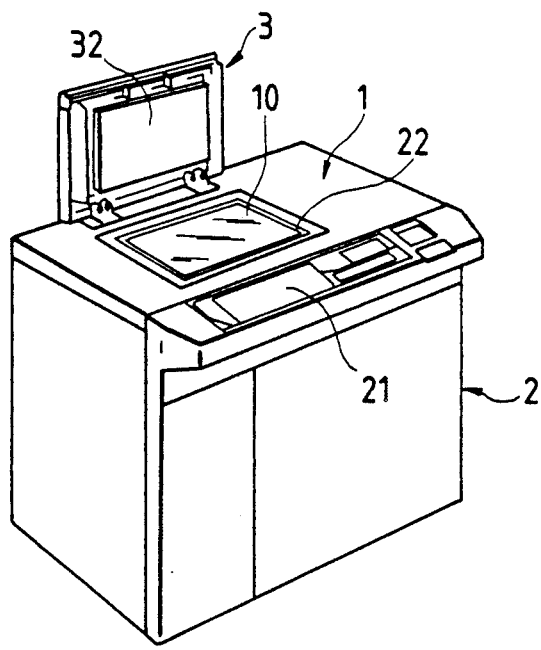
FIG. 1 shows a perspective view of a color copying machine to which an image edit system according to the present invention is applied.
Figure 2:
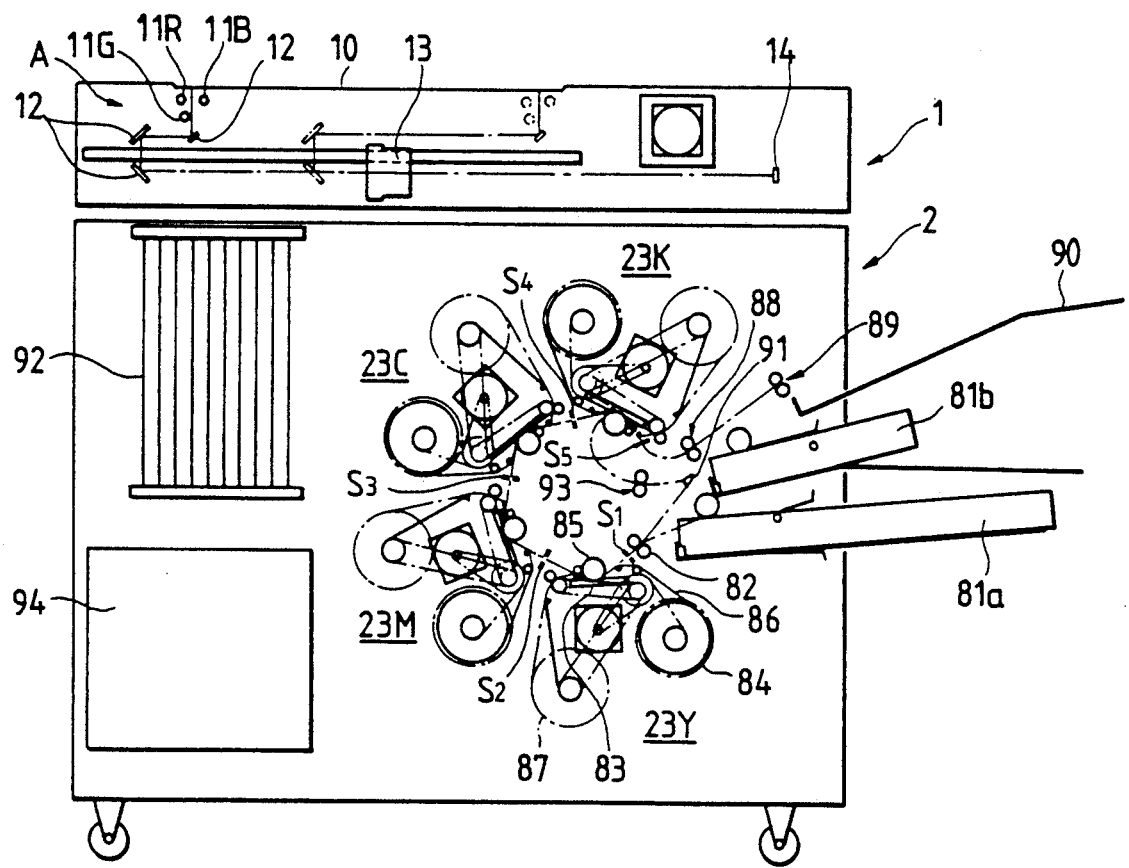
FIG. 2 shows a longitudinal sectional view of the copying machine shown in FIG. 1.
Figure 3:
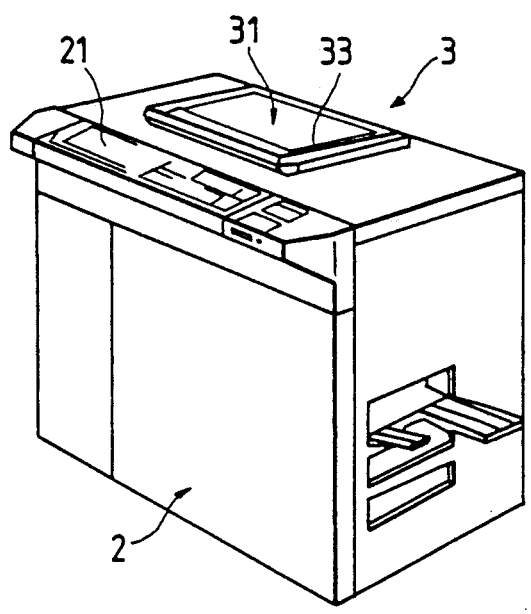
FIG. 3 shows a perspective view of the color copying machine when an edit instruction unit is closed.

FIG. 1 shows a perspective view of a color copying machine to which an image edit system according to the present invention is applied. A longitudinal sectional view of the copying machine shown in FIG. 1, is illustrated in FIG. 2. A perspective view of the color copying machine when an edit instruction unit is closed, is illustrated in FIG. 3.

In the color copying machine of the instant embodiment, a base machine is made up of a color image input unit 1 for entering image data of an original, and a color image output unit (not shown) for producing and outputting a copy image. An edit instruction unit 3 is hinged to the color image input unit 1 of the base machine 2.

In the input unit 1, an original (not shown) put on a platen glass 10 is illuminated with the lights emitted from red, green, and blue light sources 11R, 11G and 11B. The reflected light beams from the original pass through an optical system containing a plurality of mirrors 12 and a lens 13, and reach a linear image sensor 14. A scan unit A (FIG. 2) containing the light sources 11R, 11G, and 11B, and the mirrors 12 is laterally movable between a position indicated by a solid line and a position indicated by a one-dot-chain line, by means of a scanner motor (not shown). The image sensor 14 reads an image on the original in the secondary scan direction (horizontal direction in the drawing) while reading the same by one line in the main scan direction (orthogonal or vertical direction to the surface of the drawing). The color signals of red, green, and blue, that are thus collected, are supplied to the color image output unit installed in the base machine 2.

In the color image output unit, a signal processor unit 92 converts the color signals into color material signals of yellow, magenta, cyan, and black, which in turn are supplied to coloring material recording sections 23Y, 23M, 23C, and 23K.

A record paper contained in a lower tray 81a or an upper tray 81b is transported into the inside of the machine by means of a transfer roller 82, and toward the yellow recording section 23Y. In the section 23Y, an ink donor film 86 fed from a supply roll 84 and the record paper fed from the tray 81a or 81b are nipped together between a thermal head 83 and a platen roller 85. Under this condition, the thermal head 83 is driven by the yellow coloring material signal, to transfer the ink of the ink donor film 86 on the paper and to form a yellow image on the paper. After the yellow transfer, the paper is separated from the film 86, and transported to the magenta recording section 23M, while the film 86 is wound up by a wind-up roll 87. The structures of the magenta, cyan, and black recording sections 23M, 23C, and 23K are each substantially the same as that of the yellow recording section 23Y. No further description of the structures of those sections will be given.

In the magenta recording section 23M, through the operation similar to the above, a magenta image is transferred on the yellow image. Subsequently, in the cyan recording section 23C and the black recording section 23 K, cyan and black images are successively transferred on the preceding color images, finally to form a color image. The transfer of the color image in each of the respective recording sections 23Y, 23M, 23C, and 23K is done in synchronism with the scanning of the original in the color input unit 1. The record paper passes the recording sections 23Y, 23M, 23C, 23K at different times. To cope with this, the coloring material signals of magenta, cyan, and black are respectively supplied to the corresponding recording sections 23M, 23C, and 23K, with time delays amounting to the intervals between the adjacent sections.

The paper bearing an image thus transferred is outputted to an exit tray 90 with the assistance of paired rollers 88 and 89. In the figure, reference numeral 91 designates a selector pawl for selecting a color copy path or a monochromatic copy path. The selector pawl illustrated is placed for the color copy path. In a monochromatic copy mode, the pawl 91 slightly turns clockwise in the drawing, and picks up the paper from the upper tray 81b. The paper is directly transported to the black recording section 23K, by paired rollers 93. In this case, only the black ink donor film is used for the image transfer. Accordingly, a paper transfer path within the color image output section 2 is shortened and hence a copy time is reduced. In the figure, reference numeral 94 designates a power supply for supplying electric powers to the respective portions. Symbols $S_1$ to $S_5$ represent sensors for detecting paper jam, for example.

The respective recording sections and the rollers are driven by a recording section motor (not shown).

At the top of the color image input unit 1, the edit instruction unit 3 is mounted in a swingable manner. When turned down, it covers the platen glass 10. When it is turned up, the platen glass is placed open. The edit instruction unit 3 serves as a platen glass. An edit instruction entering plate 31 is installed on the upper surface of the unit 3. A white original holder 32 is installed on the lower surface of it facing the platen glass 10.

The edit instruction unit 3 will be described in detail below.

The edit instruction unit 3 is for designating an edit area or a type of edit when an original, after it is subjected to a given image processing, is copied.

The unit 3 is a kind of coordinates input unit, called a digitizer. It has a plane of the A3 size. The unit 3 allows for designation of a position on the plane as indicated by an electronic pen.

Figure 4:
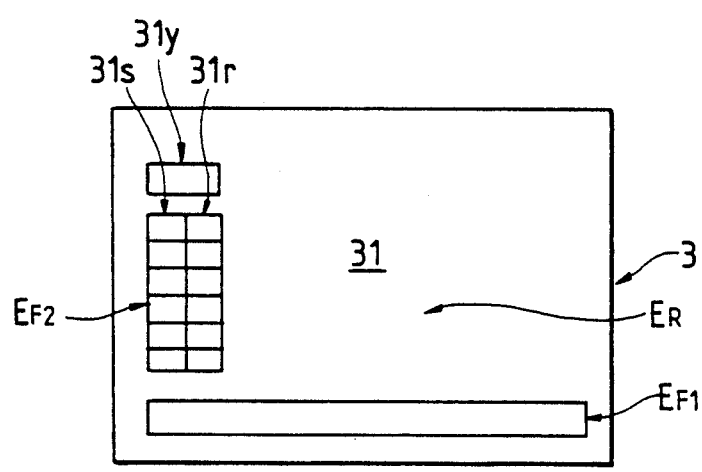
FIG. 4 is a plan view showing a model of an edit instruction entering plate of the edit instruction unit.

As best illustrated in FIG. 4, an edit-area designation area $E_R$ for designating an edit area and an edit function area $E_{F1}$ for a type of edit, for example, are laid out on the edit instruction entering plate 31 of the edit instruction unit 3. Keys for selecting one of the ways to designate an edit area and a key for selecting one of edit functions are provided in the edit function area $E_{F1}$. Another function area $E_{F2}$ located in the edit-area designation area $E_R$ contains a key to designate standard colors and registered colors, a key to designate a location to which an image is moved when an edit progresses, and the like.

Figure 5:
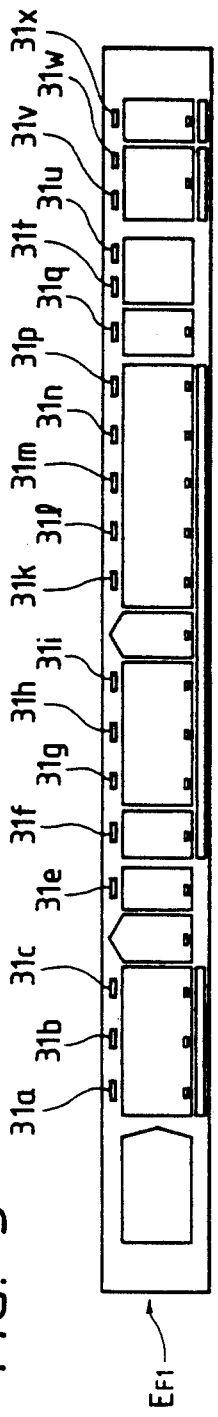
FIG. 5 is a partially enlarged plan view of the edit instruction entering plate.

The keys for designating an edit area are, for example, a frame designating key 31a, a free-configured/polygon figure designating key 31b, and a square figure designating key 31c, as shown in FIG. 5. A next area key 31e is further included. There is a case that the same function is set for two different areas. In this case, after one area is designated, the other area must be designated. To effect this, the next area key 31e is used.

The function select keys are a partial color document key 31f used for a black character processing outside a designated area and a color processing within the designated area, a negative/positive inverting key 31g for applying the negative/positive inverting processing to an area designated by the edit instruction unit 3, a color change key 31h for changing a color of an image within a designated area into a designated color, a coloring key 31i for coloring purposes, a delete key 31k for deleting an image, a pick-up key 311 for picking up an image, a pick-up/movement key 31m for picking up an image at a location and moving it to another location, a successive composition key 31n for successively reading images on two originals placed side by side on the platen glass 10, and composing them into a single image, an image repeat key 31p for repetitively generating a partial pattern on an original at different location in a single image, and the like. Reference symbol 31q designates an end key for indicating the end of the area designation and the setting of functions.

In addition to the keys mentioned above, the following keys are provided: a clear key 31t for clearing the operation done just before, an all clear key 31u for clearing all the edit functions as set, a memory register key 31v for registering the edit functions as already set into a memory card (not shown), which can be removably set to the base machine 2, a memory read key 31w for reading out a desired edit function from the memory card storing the edit functions, an area altering key 31x for altering an area as set, and the like. Some of the keys referred to above serve as double function keys.

An operation panel 21 is installed on a top side surface of the base machine 2, as shown in FIGS. 1 and 3.

Figure 6:
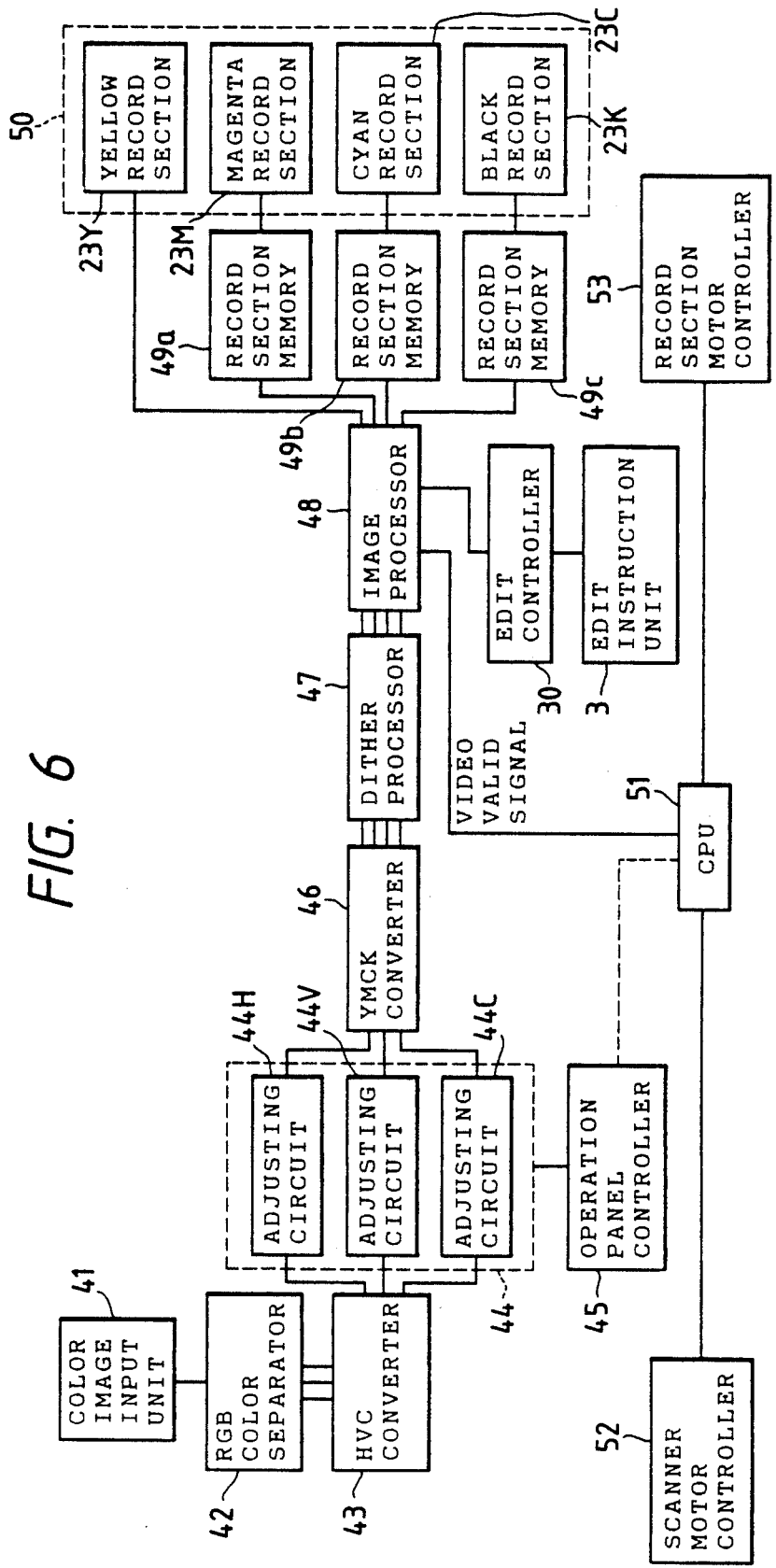
FIG. 6 shows a block diagram of a control/processing system contained in the copying machine.

A circuit for processing image signals obtained by the image sensor 14, and a circuit for controlling the scanner motor, the recording section motor, and the like, will be described with reference to FIG. 6 showing those circuits in block form.

An output signal of a color image input device 41 including the image sensor 14, which is contained in the color image input unit 1 (FIG. 1), is applied to an RGB color separator 42. The color separator separates the received image signal into three color signals of red, green, and blue. These color signals are applied to an HVC converter 43 where these are converted into a hue signal $H_1$ a value signal V, and a chroma signal C. These signals H, V, and C are applied to an adjusting section unit 44 made up of adjusting circuits 44H, 44V, and 44C. The adjusting unit 44 also receives adjusting signals from an operation panel controller 45 provided in connection with the operation panel 21, and appropriately adjusts the hue, value and chroma signals H, V, and C.

After being adjusted in adjusting unit 44, the signals H, V, and C are supplied to a YMCK converter 46 where those signals are converted into yellow, magenta, cyan, and black signals. The output signals of the converter 46 are applied to a dither processor 47, and then to an image processor 48.

The image processor 48, coupled through an edit controller 30 with the edit instruction unit 3, is capable of making edit processings, such as "Pick-up" and "Delete", for the designated area on the document, in response to the instructions from the edit instruction unit 3. The edit controller 30 and the image processor 48 will be described in detail later.

The output signal of the image processor 48 is supplied to the respective recording sections 23Y, 23M, 23C and 23K of yellow, magenta, cyan, and black, that are contained in a color image output unit 50. Record section memories 49a, 49b and 49c are provided between the image processor 48 and the recording sections 23M, 23C and 23K, respectively.

A CPU 51 supplies a control signal to a scanner motor controller 52, thereby to control the revolution of the scanner motor which drives the scan unit A (FIG. 2) in the color image input unit 1. CPU51 supplies another control signal to a recording section motor controller 53, thereby to control the revolutions of each of the motors for driving the recording sections and the rollers.

The CPU 51 supplies a video valid signal to the image processor 48. The video valid signal is for determining a recording area in each recording section. During a high level period of the video valid signal, for example, the output signal of the image processor 48 is made valid.

The edit control circuit 30 and the image processor 48 will be described in detail with reference to FIG. 7.

A digitizer 61 contained in the edit instruction unit 3 is coupled through a digitizer controller 62 to a CPU 63 for edit control purposes. When the edit-area designation area $E_R$ (FIG. 4) is subjected in the edit instruction unit 3, the CPU 63 processes the coordinates data as area data. When the keys in the function-designation areas $E_{F1}$ and/or $E_{F2}$ are operated, it processes the coordinates data as function data.

The CPU 63 for edit control purposes is connected through a host I/O (input/output) device 64 to a host CPU (not shown) of a main frame. The CPU 63 is connected through a latch 65 and a gate 66 to a depicting device called a CRTC (cathode ray tube controller) 67. The CRTC 67 is connected to a bit map memory 68. In accordance with coordinates data or a depicting command from the CPU 63, the CRTC 67 daubs or paints out a closed area in the bit map memory 68 at a high speed or reads out data from the bit map memory 68 at a high speed by the DMA (direct memory access) transfer. The CRTC 67 may be LSI (large scale integrated circuit) HD63484, manufactured by HITACHI company in Japan. The daubing or painting out of the closed area is performed by setting "1", for example in the bits in the area of the memory 68 as defined by the designated coordinates.

The CPU 63 is coupled with a RAM 69 for storing the coordinates data and a function number representative of the type of processing, which are entered from the digitizer 61. The CPU 63 and the CRTC 67 are coupled through gates 70 and 71 with a RAM table 72 and a registered color RAM 73. The RAM table 72 stores the correspondence of function numbers and function codes for actual use for processings. The RAM 73 stores the correspondence between color codes and the colors registered by a user in a tabulated fashion.

An example of the table of the RAM 72 is shown Table I. In the table, a letter "H" attached to each function code indicates a hexadecimal.

TABLE 1

| Type of Processing | Function No. | Function Code |
|---|---|---|
| No Processing | 0 | $00_H$ |
| Delete | 1 | $80_H$ |
| Coloring of red | 2 | $C3_H$ |

In an image processing mode, the CRTC 67 reads out data from the bit map memory 68. The RAM table 72 is accessed in synchronism with the scanning of an original under control of a sync circuit 64, so that a function code corresponding to a function number is read out of the RAM table 72. The function code is applied to a data processor 75. Then, the data processor processes the image signal from the dither processor (FIG. 6) in accordance with the function code. A standard color ROM 76 prestores predetermined standard colors. When a user uses one of the standard colors, data is read out of the standard color ROM 76, not the registered color RAM 73, and is subjected to an image processing.

The data processor 75 consists of a look-up table, for example. When a function code "$00_H$" corresponding to "No processing" is entered, the processor 75 allows the image data to pass as intact. When a function code "$80_H$" corresponding to "Delete" is entered, it prohibits all the image data from passing therethrough. When a function code "$C3_H$" corresponding to "Coloring of Red" is entered, it imposes a signal representative of "Coloring of Red" on the image data passing therethrough.

With such an arrangement, an image on an original is scanned, while data is read out of a corresponding area of the bit map, memory. The image data is compared with the memory data of each and every pixel, or bit. On the basis of the comparison result, a predetermined processing is executed. In this way, a predetermined image processing can be applied to the area designated by the edit instruction unit 3.

In the color copying machine of the instant embodiment, various types of image processings are possible by the control/processing system arranged as mentioned above.

There is a case where a user desires to emphasize a character or characters by marking with a line underneath. Let us consider an example that a series of characters "ABCD" on an original shown in FIG. 8(a) is marked with a red line underneath, that is, an image containing underscored characters "ABCD" is obtained as shown in FIG. 8(b).

To start, the edit instruction unit 3 of the color copying machine is turned down to close. An original to be edited and copied is placed on the edit instruction entering plate 31, facing its image bearing surface upward. To properly position the original, the lower right of the original is made in close contact with a guide 33 provided on the plate 31.

Then, a location in the image to be underscored is designated by using the edit instruction unit 3. The operation of this follows.

The square figure designating key 31c, which is contained in the function designation area $E_{F1}$ on the edit instruction plate 31 (FIGS. 4 and 5) is first pushed. A start point $P_1$ and an end point $P_2$ of an underline are designated by an electronic pen (not shown).

The memory register key 31v is pushed. In this instance, the key 31v has a plurality of functions. Normally, when the key 31v is pushed, a preset edit function is loaded in a memory card (not shown), which is removably set to the base machine. When a square area is designated and the coordinates of two points are entered, and then the memory register key 31v is pushed, a straight line is depicted on the basis of the coordinates data of the two points.

In this case, the coordinates of the end point $P_2$, before loaded, are shifted so that a straight line given between the start point $P_1$ and the end point $P_2$ is vertical or horizontal with respect to the start point $P_1$. For example, when the end point $P_2$ lies within an area defined between the X-axis containing the start point $P_1$ and a line originating from the start point $P_1$ and turned by 45° from the X-axis, the coordinates of the point $P_2$ are replaced with the coordinates of a point $P_3$, which lies at the intersection of the X-axis and a line containing the point $P_2$ parallel to the Y-axis, as show in FIG. 9(a). When the end point $P_2$ lies within an area defined between the Y-axis containing the start point $P_1$ and a line originating from the start point $P_1$ and turned by 45° from the Y-axis, the coordinates of the point $P_2$ are replaced with the coordinates of a point $P_3$, which lies at the intersection of the Y-axis and a line containing the point $P_2$ parallel to the X-axis, as shown in FIG. 9(b). The processing for the replacement of the coordinates of the end point is performed by the CPU 63, for example, when data is writing into the bit map memory 68 to be given later.

As the result of the replacement of the coordinates of the end point $P_2$, even when a straight line connecting the start point $P_1$ and the end point $P_2$ as are entered by a user is slightly slanted with respect to the characters, an underline or underscore is exactly parallel to the characters in the output image.

Then, an operator pushes a coloring key 31i, and designates a desired color by selecting a standard color designating portion 31r or a registered color designation portion 31s, which are provided in the function designating area $E_{F2}$.

In this instance, the color of the line will be red, so after the coloring key 31i is pushed, the red portion is pushed. The red portion is located in standard color designating portion 31r.

A default of a straight line to be depicted indicates a single line of 0.5 mm wide. This amounts to a 2-bit width in the bit map memory 68. The width or the number of lines can be changed in the following way. For a single line of 0.75 mm wide (amounting to 3 bits), the memory register key 31v is pushed. For two lines each of 0.5 mm wide, a memory call key 31w is pushed. For two lines each of 0.75 mm wide, an area altering key 31x is pushed. With the key operations, a straight line can be drawn, which is separated from or adjacent to and parallel to the line connecting the coordinates of the designated points. The keys 31w and 31x are used as keys exercising other functions than their original functions.

Following the designations as mentioned above, the end key 31q is operated. At this point, the edit instruction work for drawing the line ends.

The coordinates data of the start point $P_1$ and the end point $P_2$, data indicative of the straight line drawing as the type of edit, data indicative of the type of line, and color data, which are entered from the edit instruction unit 3, are stored in a predetermined format into the RAM 69 which is provided in the edit controller 30, in connection with the edit instruction unit 3.

The operation for editing an image will be described.

The operator removes the original from the edit instruction entering plate 31 of the edit instruction unit 3, and opens the unit 3 as shown in FIG. 1. Then, he places the original, facing down, on the platen glass 10 of the color image input unit 1. To position the original correctly, the lower left of the original (corresponding to the lower right as viewed from the image side) is abut to a guide 22 of the color image input unit 1.

Figure 7:
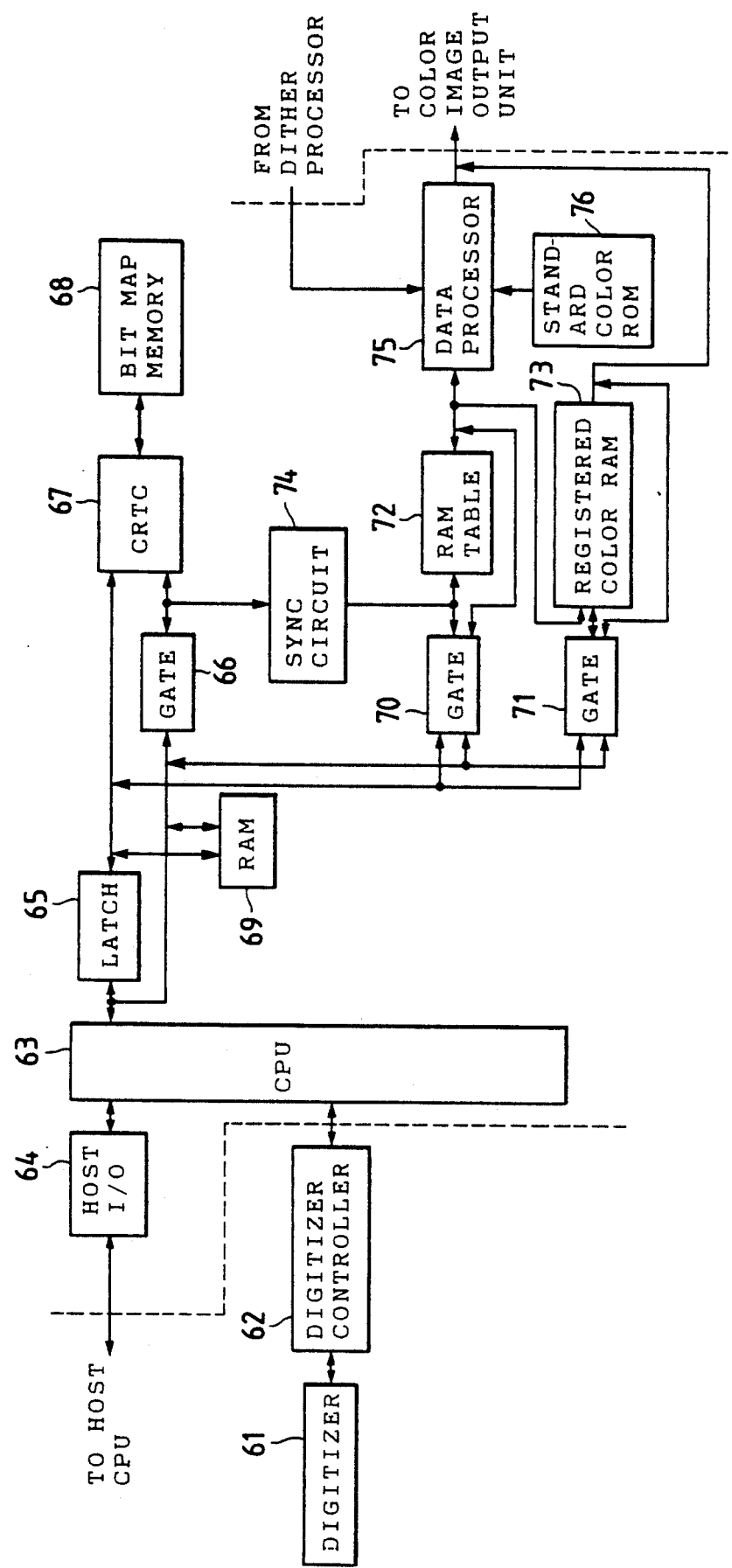
FIG. 7 shows a block diagram of an image edit circuitry in the control/processing system of FIG. 6.

When the start key (not shown) installed in the operation panel 21 of the base machine 2 is operated, the host CPU (not shown) of the base machine sends a start command to the CPU 63 of the edit controller 30, through the host I/0 64 (see FIG. 7). In response to this command, the CPU 63 reads out the data representative of the coordinates data and the type of edit, which are stored in the RAM 69, and sends it as a drawing command to the CRTC 67. In response to the command, a bit pattern corresponding to the area defined by the coordinates data is written into the bit map memory 68. Further, a function number is written into the RAM table 72 in accordance with the type of edit.

The bit map memory 68 contains three memory planes for image drawing purposes. The function codes are capable of drawing a maximum of 7 ($=2^3-1$) areas. Each memory plane of the bit map memory 68 has a memory space amounting to an area of a record paper which is the largest of those papers that can be handled by the base machine 2. The memory plane stores functions [1] to [7]. In the case of drawing a red line, a function number [2] is loaded in the location corresponding to the line from the start point $P_1$ to the end point $P_3$.

After the bit pattern is drawn in the bit map memory 68, the CPU 63 writes the correspondence between the function number and the function code, which were drawn on the bit map memory 68. More specifically, the code "$00_H$" for "No processing" is loaded into the location of the address 0; the code "$80_H$" for "Delete", into the location of the address 1; and the code "$C3_H$" for "Coloring of Red", into the location of the address 2.

At the completion of the above processing, the CPU 63 sends a ready signal through the host I/O 64 to the host CPU (not shown). In response to the ready signal, the base machine 2 starts a copy operation. In turn, the base machine 2 sends a page sync signal and a line sync signal, which is synchronized with the scanning of an original. In this case, the CPU 63 has previously sent a DMA transfer command to the CRTC 67, and sequentially reads out the contents in the bit map memory 68 in accordance with each sync signal. To control the timing of this read operation, the sync circuit 74 is provided in connection with the CRTC 67.

A signal read out of the bit map memory 68 is converted into a function code by the RAM table 72, and then is applied to the data processor 75. The processor 75 decodes the function code, and processes the image data in accordance with the decoded function code.

When the line portion, as shown in FIG. 8(b), between the start point $P_1$ and the end point $P_3$ on the original is scanned, the processor 75 receives the function code "$C3_H$" for the "Coloring of red". Accordingly, it imposes a red signal on the image data of the original. When other portions than the red portion are scanned, it receives the function code "$00_H$" for the "No processing", it produces the image data as intact.

In this way, a designated image processing for the designated area is performed, to obtain an image in which the character series "ABCD" is marked with an underline $Q_1$, as shown in FIG. 8(b).

In a similar way, the character series "ABCD" on the original image in FIG. 10(a) may be framed and copied, as shown in FIG. 10(b).

To frame the character series, the coordinates of two points $P_1$ and $P_2$ likewise are entered. In this case, however, a rectangular frame whose the diagonal line connects the points $P_1$ and $P_2$ as its vertices, is formed, and a predetermined function number is written into the location corresponding to the rectangular frame in the bit map memory 68. Accordingly, by processing the image data of the original while reading out the corresponding contents of the bit map memory, when a copy is made, a frame $Q_2$ enclosing the characters "ABCD" can be drawn, as shown in FIG. 10(b).

An embodiment of the present invention to be described below may edit an image within a predetermined area extending about the coordinates of each entered point. For example, if the coloring is designated for an area which is variable about the coordinate of each entered point, a desired figure can be configured with of a desired thickness corresponding to that of a thin pencil point, a thick pen point, or a paint brush. Such a processing will be referred to as a "trace" in the specification.

Let us consider a case how to draw a red figure of a free configuration.

To start, the free-configured/polygon figure key 31b in the edit instruction entering plate 31 shown in FIG. 5 is operated, and the frame designation key 31a is operated. Through the key operations, the type of the image edit is determined to be the "trace".

Then, a figure to be drawn is designated. When it is a a closed curve $Q_3$ as indicated by a broken line shown in FIG. 11(a), the closed curve $Q_3$ is drawn with an instructive pen continuously pressed against the edit instruction entering plate 31. From a predetermined distance from the entered coordinates of a point, new coordinates of points are progressively and automatically inputted to the machine. If a figure to be drawn is not continuous, the coordinates are designated discretely.

After the "trace" ends, necessary edit functions are designated. Many edit functions, such as "Coloring", "Color change", "Nega/posi inversion", and "Delete", are applicable for the traced curve $Q_3$. To effect a desired function, one of the related keys, coloring key 31i, color change key 31h, nega/posi inversion key 31g and delete key 31k is operated. When one of the keys other than the delete key is operated, then an intended portion, which is installed in the standard color designating portion 31r or the registered color designation portion 31s in the function designation area $E_{F2}$, is pushed to designate the color. In this instance, the color of the figure is red, and hence the coloring key 31i is pushed and the red portion is pushed.

To effect a copy work to be given later, before copying the original, a given function number, or a function code "2" corresponding to the "red coloring", is written into the location corresponding to the traced curve $Q_3$ in the bit map memory 68. Accordingly, by processing the image data of the original while reading out the corresponding contents in the bit map memory 68, when copy is made, a closed curve $Q_4$ of red can be drawn as shown in FIG. 11(b). As for the edit functions of the "Color change", "Nega/posi inversion", and "Delete", the processings is performed in accordance with the related function codes. The processing unit is a square of 5.0 mm×5.0 mm centered at the designated coordinate for the default. The size of the processing unit can be changed in the following way. To change it to a square of 2.0 mm×2.0 mm, the memory register key 31v is pushed. To change it to a square of 3.5 mm×3.5 mm, the memory call key 31w is pushed. To change it to a square of 6.5mm×6.5mm, the area altering key 31x is pushed. By pushing each of the above keys, a painted area about the designated coordinates is altered to determine the size of each dot when the image is outputted. For example, when the dot size is enlarged, a closed line $Q_5$ with irregular fringes which is an aggregation of a number of squares is drawn, as shown in FIG. 11(c).

The drawing of the figures of free configuration is handled in the above instance, but it is evident that the present embodiment can be exercised in many other modes.

For example, it may be used for removing spots on an original. To effect this, when copy is made, the coordinates of the center of each spot are designated, and the edit function of "Delete" is set for a given area about the designated coordinates. In this way, the spots on the original can be removed with the feeling that those are painted with whitewash, thereby to obtain a clean copy.

There is a pick-up/movement as one of the image processings that can be made by the copying machine according to the present invention. In this edit mode cf pick-up/movement, an image on an original placed on the platen glass 10 (see FIG. 2) is read by the scanning, only the image within a designated area is picked up, and is moved to a designated location on a record paper.

The pick-up/movement edit mode will be described hereinafter.

Let us consider an example that a slanted area R on an original D shown in FIG. 12(a) is picked up and enlarged, and moved to a slanted area S of a record paper in FIG. 12(e). In this example, the length of the area R in the main scan direction is "m", the length in the vertical scan direction is "l", and the length of the area S in the main scan direction is M, the length in the vertical scan direction is L. The coordinates of the respective vertices of the areas R and S are calculated with respect to a reference point that is the end point of the main scan and also the start point of the vertical scan.

An original D is first put on the edit instruction entering plate 31.

Two vertices for a diagonal line of a square as an object to be edited are designated by the edit instruction unit 3.

To be more specific, the square key 31c in the function designation area $E_{F1}$ of the edit instruction entering plate 31 (see FIG. 4) is first pushed to designate the way to set an edited area, and then two vertices $P_4$ and $P_5$ shown in FIG. 12(a) are designated. In this instance, the square is selected for the edit area designating way, but if required, the free-configured figure may be selected.

After the pick-up/movement key 31m is pushed, a location to which the square is to be moved or destined is selected from among five locations, upper left, upper right, lower left, lower right, and center by means of a destination designating key 31y. In this instance, the lower left is selected. When the key 31y is not pushed, the center is automatically selected.

Finally, the end key 31q is pushed. Upon pushing the end key, the coordinates data of the edit area as set by the edit instruction unit 3 and the data indicative of the pickup/movement as the edit mode are stored in a predetermined format into the RAM 69 in the edit controller 30, which is provided in connection with the edit instruction unit 3.

At this point, the edit instruction work for the pick-up/movement mode is completed.

The image edit operation when the machine is in the pick-up/movement mode will be described with reference to FIGS. 12(a) through 17(c). FIGS. 12(a) through 12(e) are explanatory diagrams comparatively showing an image on an original and an image on a record paper when the machine is in the pickup/movement mode. FIG. 13 is an explanatory diagram showing a timing relationship between a scan section and a record section when the machine is in the pick-up/movement mode. FIG. 14 is an explanatory diagram showing a movement of the scan unit when the machine is in the pick-up/movement mode. FIG. 15 shows a block diagram of a hardware for the the pick-up/movement mode. FIG. 16(a) shows a flowchart of a main program for controlling the copying machine. FIG. 16(b) shows a flowchart of a program for controlling the record unit. FIGS. 17(a) through 17(c) show a set of waveforms at key signals in the pick-up/movement mode.

After the edit instruction work for the pick- up/-movement mode is completed, the original is removed from the plate 31 of the unit 3, and it is placed on the platen glass 10.

Then, the start key (not shown) in the panel 21 of the base machine 2 is pushed (step 101 in FIG. 16(a)). The host CPU in the base machine 2 issues a copy start command to the CPU 63 in the edit controller 30 by way of the host I/O 64 (see FIG. 7) (step 102 in FIG. 16 (A)). In response to the start command, the CPU 63 reads out the coordinates data and the data of the edit type, which are stored in the RAM 69, and applies them as drawing commands to the CRTC 67. As a result, the edit type data, i.e., a function number, is written into an area defined by the coordinates data in the bit map memory 68. In the case of picking up the area R, for example, the function number "1" corresponding to the "Delete" is written into areas other than the area R.

After writing the function number and the edit type data into the bit map memory 68, the CPU 63 writes the correspondence between those items of data into the RAM table 72. At the instant that the processings are completed, the CPU 63 sends a ready signal through the host I/O 64 to the host CPU (not shown). In response to the ready signal, the base machine 2 starts a copying operation (step 103). More specifically, the CPU 51 (see FIG. 6) transfers a scan start signal to the scanner motor controller 52. The controller 52 starts to move the scan section A, as shown in FIG. 14. When the scan section A moves from a home position and reaches a position $y_1$, it is stopped (step 104). At this time, the CPU 51 outputs a paper feed command to the record section motor controller 53 (step 105).

In the record section, when receiving the paper feed command (step 201 in FIG. 16(b), control starts to feed record paper at a fixed speed (step 202). When the lead edge of the paper reaches the head position of the record section (step 203), the recording of the image on the paper begins. At this time, a sync signal is supplied to the scanner motor controller 52, and "Copy in progress" representing a record section status is outputted (step 204).

In the scanner motor controller 52, when receiving a sync signal from the record section motor controller 53 (step 106), a timer is set at a time taken for record paper to reach the position $Y_1$ (step 107), and control waits (step 108). At the instant that the paper reaches the position $Y_1$, a memory read start address is applied to a memory read counter 40a shown in FIG. 15 (step 109). The memory read counter 40a is used for designating a read start address of a read buffer 40b, used for storing the data read from the color image input unit 41 in one line amounts.

The read buffer 40b has a length corresponding to the length of the platen glass 10 in the main scan direction, as shown in FIG. 12(b), and is capable of storing one line of the image data read bit by bit by the image sensor 14 (FIG. 2). When an image edit is made, the image data of the original is read out of the buffer 40b. The read operation of the image data starts from an address location corresponding to an area designated by the edit instruction unit 3, that is, address $x_2$ toward a fixed home position address (in the instance of FIG. 12). This address $x_2$ is a memory start address.

A main scan magnification signal is applied to an enlargement/reduction circuit 40d (step 109). The circuit 40d enlarges or reduces the size of an image by controlling the read operation from the buffer 40b. When the main scan magnification is 200%, for example, the same image data is repeatedly outputted two times. When it is 50%, the image data is thinned out to be half of it, and the halved image data is outputted. The output signal of the circuit 40d, together with a video valid signal, is applied to the gate 40e. Accordingly, the output signal of the circuit 40d is valid during only the image valid period on the record paper. The memory read counter 40a, read buffer 40b, differential circuit 40c, enlargement/reduction circuit 40d, and gate 40e are disposed in a signal path ranging from the color image input unit 41 to the RGB color separation circuit 42 in the block diagram of FIG. 6. A signal path ranging from the RGB color separation circuit 42 to the dither processing circuit 47 in the block diagram of FIG. 6 are illustrated as the color processor 40f in FIG. 15. The output signal of the dither processing circuit 47 is supplied to the image processor 48 for edit processing purposes.

With this, the base machine 2 outputs a page sync signal and a line sync signal, which are synchronized with the scanning of the original. The CPU 63 resets the address of the bit map memory 68 in synchronism with the page sync signal, and subsequently sends a DMA transfer command to the CRTC 67 in synchronism with the line sync signal, and sequentially reads out the contents of the bit map memory 68. To control the timings of that operation, the sync circuit 74 is provided in connection with the CRTC 67.

The data signal read out of the bit map memory 68 is converted into a function code by the RAM table 72, and the converted function code is inputted to the data processor 75. The data processor 75 decodes this function code and appropriately processes the image data in accordance with the decoded data.

When areas other than the area R on the original D shown in FIG. 12 are scanned, the processor 75 receives the function code ($80_H$" corresponding to the "Delete". Accordingly, those areas are deleted. When the area R is scanned, it receives the function code "$00_H$" corresponding to the "No processing". Accordingly, the image data of the original is outputted as intact. In the color copying machine under discussion, the function number "0" corresponding to the "No processing" is stored as an initial value in the bit map memory 68.

As the result of the above sequence of processings, the machine is ready for the image processing on the designated area.

In the record section, as shown in FIG. 12(c), a video valid signal is outputted of which the length corresponds to the length M of the paper in the main scan direction (step 109 in FIG. 16(a)). The leading edge of the video valid signal is differentiated by the differential circuit 40c, to form a load signal, which in turn is applied to a memory read counter, 40a. Accordingly, a memory read start address is loaded in to the counter 40a at the timing of the leading edge of the video valid signal, to determine a read start position on the original in the main scan.

A line sync signal is also outputted, of which the length corresponds to the length of the record paper in the main scan direction, as shown in FIG. 12(d). The line sync signal (FIG. 17(c)) and the video valid signal (FIG. 17(b)) are outputted in synchronism with a line reference signal that is generated every time the main scan starts (FIG. 17(a)).

Then, the movement of the scan section A starts again. The image data is continuously read from the original until the scan section reaches the position $y_2$ (step 110), while at the same time it is recorded on the paper (step 204). A scan speed of this scan is a reciprocal of a magnification as set. In the case of FIG. 12, a magnification is L/l, and hence the scan speed is l/L times that for 100% magnification. In the enlargement/reduction circuit shown in FIG. 15, the image data is doubled or halved in accordance with a magnification as set.

Accordingly, the image data multiplied by M/m in the main scan direction and by L/l in the vertical scan direction is produced during a distance between $X_1$ and $X_2$ in the main scan direction and a distance between $Y_1$ and $Y_2$ in the vertical scan direction.

When the scan section A reaches position $y_2$, it is stopped and the video valid signal is also stopped. And it is reversely moved to the home position, i.e., the reference point (0, 0), as shown in FIG. 14 (step 111).

In the record section, when the record on the paper is completed, "Paper exit completion" representing a record section status is outputted (steps 205 and 206).

After the scan ends, a main program monitors a status in the record section. When it is "Copy in progress", the step 112 is looped. When it is "Paper exit complete", control returns to step 101. At this time, the processings for the image edit is completed.

The color copying machine of the instant embodiment has another image edit function called an analogous composition. When the machine operates in the mode of the analogous composition, an original for a color image output portion is placed on the portion containing the scan start position on the platen glass 10 (FIG. 2), that is, the first half of the platen glass 10 (FIG. 2). Another original for a monochromatic image output portion is set on the remaining portion, or the second half, of the platen glass. A part of an image of one of the originals is inserted into a part of an image of the other original, with an equal height/width ratio, viz., in an analogous fashion.

In the instant embodiment, when the composition is made, an area whose location and size are the same as those of an area into which a partial image is inserted or applied (referred to as an inserting image), is drawn in the bit map memory 68. When the inserting image is read in, the "Delete" is set for the area except the area to be inserted, and the "No processing" is set for the to be inserted area. When the image on the original into which the partial image is to be inserted (referred to as an inserted image) is read in, the "No processing" is set for the area except the inserted area, and the "Delete" is set for the inserted area. The same contents are read out of the bit map memory 68 two times, for reading in the image to be inserted and for reading in the image to which the partial image is to be inserted.

In this way, the images on both the originals are composed. The areas of those images are adjusted so as to maintain the magnifications in the main and secondary scan directions.

Whether the inserting image original and the inserted image original are put on the first half and the second half of the platen glass or the second half and the first half, depends on a designer's selection.

The operation of the copying machine when it is placed in the mode of an analogous composition in which an original bearing an inserting image is put on the first half of the platen glass, and an original bearing an inserted image is placed on the second half, will be described in detail.

In the analogous composition, as shown in FIG. 18($a$), an image within a designated area $R_1$ on an original $D_1$ of A4 size placed on the first half is inserted into a designated area $R_2$ on an original $D_2$ of A4 size placed on the second half, to form a composite image. In this instance, a distance from position $y_1$ to position $y_2$ in the area $R_1$ in the secondary scan direction is "l", and a distance from position $x_2$ to position $x_1$ in the main scan direction is "m". A length of the area $R_2$ in the secondary scan direction is L which starts from a position distanced by Y toward the original $D_2$ from point $y_3$ positioned at the border between the originals $D_1$ and $D_2$. A length of the area $R_2$ in the main direction between positions $x_4$ and $x_3$ is M. Further, $(M/m) \times 100 = 130\%$, and $(L/l) \times 100 = 240\%$. The coordinates of the verticies of the areas $R_1$ and $R_2$ are calculated with a reference point which is the end point of the main scan and also the start point of the secondary scan.

As shown in FIG. 3, the edit instruction unit 3 of the machine is closed, and an original whose image is to be edited is put on the edit instruction entering plate 31, facing the image bearing surface upward.

By using the edit instruction unit 3, two vertices on the diagonal line of a square containing an image to be edited are designated.

To be more specific, an operator first pushes the square key 31c in the function designation area $E_{F1}$ of the edit instruction entering plate 31 (FIG. 4) shown in FIG. 5. After the way of edit area setting is designated, two vertices $P_6$ and $P_7$ shown in FIG. 18($a$) are designated. In this instance, the square is selected for the way of edit area setting. If required, the figure of a free configuration may be selected.

After pushing the successive composition key 31n, he enters two vertices $P_8$ and $P_9$ on the diagonal line of the area $R_2$ on the original $D_2$ placed on the second half, with an electronic pen (not shown).

Then, he pushes the memory call key 31w serving as the analogous composition key, and finally pushes the setting end key 31q. Then, the coordinates data of the edit area and the data indicative of the type of edit, which are entered by the edit instruction unit 3, are stored in a predetermined format in the RAM 69 of the edit controller 30, which is provided in connection with the unit 3.

At this point, the edit instruction work for the analogous composition is completed.

An edit operation for the analogous composition will be described with reference to FIGS. 18($a$) to 20. FIGS. 18($a$) and 18($b$) are explanatory diagrams comparatively showing images on an original and an image on a record paper when an analogous composition mode is exercised. FIG. 19 is an explanatory diagram showing a timing relationship between the scan section and the record section when the analogous composition mode progresses. FIG. 20 is an explanatory diagram showing a movement of the scan unit in the analogous composition mode.

After the edit instruction work for the analogous composition mode is completed, the original is removed from the plate 31 of the unit 3, the unit 3 is opened as shown in FIG. 1, and the originals D and Dz are placed on the platen glass 10, facing downward.

Then, the start key (not shown) in the panel 21 of the base machine 2 is pushed. The host CPU in the base machine 2 issues a copy start command to the CPU 63 in the edit controller 30 by way of the host I/O 64 (see FIG. 7). In response to the start command, the CPU 63 reads out the coordinates data and the data of the edit type, which are stored in the RAM 69, and applies them as drawing commands to the CRTC 67. As a result, a given area is written into the bit map memory 68 in accordance with the coordinates data. Furthe, the edit type data, i.e., a function number, is written into the RAM table 72.

When the data are written into the bit map memory 68, a written area is determined by the size and the height/width ratio of the areas $R_1$ and $R_2$ on the orignals $D_1$ and $D_2$. In this instance, a magnification in the main scan direction is 130%, and a magnification in the secondary scan direction is 240%. Accordingly, an area $R_3$, which is obtained by magnifying the area $R_1$ on the original $D_1$ by 130% in the main and secondary scan directions, is written into the bit map memory 68. The size of the bit map memory 68 corresponds to the A3 size, as already mentioned. An image of the same size as that of an image recorded on the paper is stored in an area (corrsponding to an area indicated by a broken line in FIG. 18($b$)) containing the start address in the bit map memory 68.

When the document $D_1$ bearing the inserting image, which is placed on the first half of the platen glass, is scanned, the "No processing" is set for the area $R_3$. The correspondence between the function number and the function code is set up in the RAM table 72 so that the "Delete" is set for the area other than the area $R_3$.

At the completion of the data write into the bit map memory 68, the CPU 65 issues a scan start command to the scanner motor controller 52. Under control of the controller 52, the scan section A starts to move, as shown in FIGS. 19 and 20. When the scan section A moves from the home position and reaches position $y_1$, it is stopped. The CPU 51 issues a paper feed command to the record section motor controller 53. The scanner motor controller 52 waits for a sync signal from the record section motor controller 53.

Upon receipt of the paper feed command, the record section motor controller 53 starts to feed paper at a fixed speed. When the lead edge of the record paper reaches the first record section, i.e., the yellow record section 23Y, the recording of the image begins, and the motor controller 53 sends a sync signal to the motor controller 52, as shown in FIG. 13.

In the scanner motor controller 52, when receiving a sync signal from the record section motor controller 53, a timer is set at a time taken for record paper to travel a distance Y. At the instant that the paper has traveled the distance Y, the scan section A is moved again. The image is read from the original $D_1$ until the scan section reaches the position $y_2$, while the image is recored on the record paper. Also in the main scan direction, the read start position is controlled on the basis of the entered coordinates data. Accordingly, the image in the area $R_1$ on the original $D_1$ is outputted on the area $R_2$ of the original $D_2$.

The contents of the bit map memory 68 are sequentially read out in synchronism with the scanning of the original. This is similar to that in the pick-up/movement mode, and hence no futher description of it will be given here.

The data signal read out of the bit map memory 68 is converted into a function code by the RAM table 72, and applied to the data processor 75. The data processor 75 decodes the function code and appropriately processes the image data in accordance with the decoded data.

When the area $R_1$ on the document $D_1$ shown in FIG. 18(a) is scanned, the function code corresponding to the "No processing" is supplied. When the area other than the above is scanned, the funciton code corresponding to the "Delete" is supplied. Accordingly, the image only in the area $R_1$ is outputted on the paper.

In this instance, the scan speed of the scan section A in the secondary scan direction is a reciprocal of the magnification which is the smaller of the magnifications in the main and secondary scan directions for the areas $R_1$ and $R_2$. In the case of FIGS. 18(a) and 18(b), the magnification L/l in the secondary scan direction is 240%, and the magnification M/m in the main scan is 130%. Accordingly, the size in the main scan direction is enlarged by 130%. The magnification of the secondary scan direction is set to be equal to that of the main scan direction, and is enlarged by 130%. That is, the scan speed is 77% for 100% magnification. At this time, the transporting speed of the paper is constant. For the size of the main scan direction, the processings for the enlagement/reduction processing are available.

Then, the controller moves the scan section A to the scan start position $y_3$ of the original $D_2$ placed in the second half, and waits for a sync signal from the record section.

When the lead edge of the record paper reaches the fourth record section, i.e., the black record section 23K, the record motor controller 53 sends a sync signal to the scanner motor controller 52.

When receiving the sync signal from the motor controller 53, the motor controller 52 again moves the scan section A. The image is read from the original $D_2$ until the scan section reaches position $y_4$, while it is recorded on the paper. At this time, the correspondence between the function number and the function code in the RAM table 72 is reprogrammed so that the "No processing" is set for the area other than the area $R_3$, and the "Delete" is set for the area $R_3$. Accordingly, the same pattern as that in the scan of the original placed on the first half is read out of the bit map memory 68. Since the "No processing" is set for the area other than the area $R_3$, and the "Delete" is set for the area $R_3$, an image as shown in FIG. 18(b) is outputted, in which an image on the original $D_2$ from which the image in the area $R_3$ is removed is laid around the image in the area $R_1$ on the orignal $D_1$, which is enlarged by 130% in the main and secondary directions. The scan speed at this time is that for 100% magnification.

Accordingly, the image in the area $R_1$ on the original D1 is inserted into the image on the original $D_2$, while maintaining the analogous configuration. Thus, even when the height/width ratio of the edit area on one original is not equal to that on the other original, the images on both the originals can be composed, while keeping the height/width ratio. Accordingly, the composed image is natural. Further, since no gap is formed between the images, the composed image is not unsightly.

As seen from the foregoing description, specific bits are written into the bit map memory, in a pattern with a certain extension existing about the points designated by the coordinates input means. When the original image is scanned, the contents of the bit map memory are read out in synchronism with the scan. During the course of the reading operation, when the pattern is detected, an image of red, for example, is superposed on an image of the original. If an area of the pattern is variable, it is possible to obtain an output image in which dots of a desired size or a line of a desired width are superposed on a proper location in the image. If the pattern area is variable, a desired figure can be configured with a desired thickness corresponding to that of a thin pencil point, a thick pen point, or a paint brush. If the "Delete" mode is set up, and the coordinates of the center of each spot are designated, the spots on the original can be removed with the feeling that those are painted with whitewash, thereby to obtain a clean copy.

What is claimed is:

1. An image edit system comprising:
   coordinates input means for inputting coordinates of a plurality of points associated with selected portions of image data of an original;
   write means for writing specific bits into locations in a bit map memory corresponding to said coordinates of said plurality of points said specific bits in said locations forming a shape;
   image input scanning means for scanning and inputting said image data of said original;
   read means for reading out the contents of said bit map memory in synchronism with the scanning by said image input scanning means; and
   edit means for selectively replacing said selected portions of image data with said shape when said specific bits are read out of said bit map memory.

2. The image edit system according to claim 1, further comprising altering means for increasing the number of locations in said bit map memory that correspond to said points of said plurality of points, thereby enlarging the shape.

3. The image edit system according to claim 1, in which said coordinates are coordinates of a start point and an end point of a line, and said shape is a line.

4. The image edit system according to claim 3, in which when said specific bits are written into said bit map memory, said coordinates of said end point are shifted so as to make the line horizontal with respect to said start point.

5. The image edit system according to claim 1, in which said coordinates are coordinates of two vertices on a diagonal line which bisects and defines a rectangular frame, and said shape is a rectangular frame.

6. The image edit system according to claim 1, in which said image input scanning means is a color image input unit.

7. The image edit system of claim 1, wherein said edit means includes means for selectively changing the contrast of said shape.

8. The image edit system of claim 6, wherein said edit means includes means for selectively changing the color of said shape.

9. The image edit system of claim 7, wherein said write means includes means, selectively operable when said plurality of points is selected to define a closed area, for selectively writing bits into locations that correspond to points associated with selected portions of image data within said closed area.

10. The image edit system of claim 8, wherein said write means includes means, selectively operable when said plurality of points is selected to define a closed area, for selectively writing bits into locations that correspond to points associated with image data within said closed area.

11. The image edit system of claim 1, further comprising means for transferring selected portions of image data of said original to another position.

* * * * *